United States Patent [19]

Greenwood

[11] 4,114,080

[45] Sep. 12, 1978

[54] EXPLOSION SIMULATING DEVICE

[76] Inventor: Quentin E. Greenwood, 1508 Granvia Altamira, Palos Verdes Estates, Calif. 90274

[21] Appl. No.: 784,716

[22] Filed: Apr. 5, 1977

[51] Int. Cl.[2] ..................... A63H 33/26; A63H 33/36; H02J 15/00

[52] U.S. Cl. .......................................... 320/1; 46/232; 272/27 R

[58] Field of Search ................. 46/176, 196, 1 E, 227, 46/232; 320/1; 272/27 R

[56] References Cited

U.S. PATENT DOCUMENTS

| | | | |
|---|---|---|---|
| 2,425,975 | 8/1947 | Witte et al. | 46/232 |
| 3,721,884 | 3/1973 | Thakore | 320/1 |
| 3,868,562 | 2/1975 | Marshall | 320/1 X |
| 3,893,013 | 7/1975 | Mironoff | 320/1 |
| 3,909,694 | 9/1975 | Yokota et al. | 320/1 |

*Primary Examiner*—Stuart N. Hecker
*Attorney, Agent, or Firm*—Rafael A. Cardenas

[57] ABSTRACT

An electro-mechanical device for simulating an explosion or report is disclosed. A capacitor is charged to a preselected voltage by a battery or a.c. source. A neon lamp indicates when the capacitor has been fully charged. One electrode of the capacitor is coupled to a spark generating grating. The other capacitor electrode is coupled to a movable plunger which makes contact with the grating for generating a spark, explosion and smoke.

10 Claims, 4 Drawing Figures

EXPLOSION SIMULATING DEVICE

FIELD OF THE INVENTION

The invention relates generally to simulating devices and in particular to spark and explosion simulating circuits.

DESCRIPTION OF THE PRIOR ART

Simulating devices are generally known in the prior art such as toy guns which simulate a gun shot. Some of these toy guns produce a report by mechanical means such as by the sudden motion of the piston within a gun or rifle barrel. The sound generated by a rapid moving piston within the gun barrel. The report generated by such toy gun is not very realistic and there is neither a flash of light nor smoke.

Another example of a toy gun is one that utilizes a cap, a paper container having a small explosive charge, for producing a report. The toy cap gun does generate a loud report but occasionally the caps do not discharge. Also cap guns do not generate a flash of light or smoke which comes from the barrel. Thus cap guns are not realistic either.

Still another example of a toy gun is the type which uses a metal arm rubbing against a rotating abrasive wheel thereby producing a shower of sparks. The limitation of such a device is that a continuous shower of sparks is emitted rather than discrete flashes as an actual gun would emit. In addition some of these toy guns employ a clicking sound effect device for simulating the report. Of course, such a sound effect device provides no realism.

OBJECTS AND SUMMARY OF THE INVENTION

Accordingly it is an object of the present invention to provide a simple, reliable and realistic explosive device.

It is another object of the present invention to provide a toy gun for generating a report having realism.

It is still another object of the present invention to provide an alarm or a sound effect device.

It is yet another object of the present invention to provide a toy gun that is safe for children to operate.

In accordance with the above objects an explosion simulation device include means for providing power coupled to a charging circuit. The charging circuit regulates the charge applied to energy storage means having first and second electrodes. The first electrode of the storage means is coupled to a second contact. The second electrode of said storage means is coupled to a first contact. Control means are coupled to a second contact for selectively making electrical connection between the first and second contacts for discharging the storage means and generating a report and flash of light.

DETAILED DESCRIPTION OF THE DRAWINGS

Figure 1:
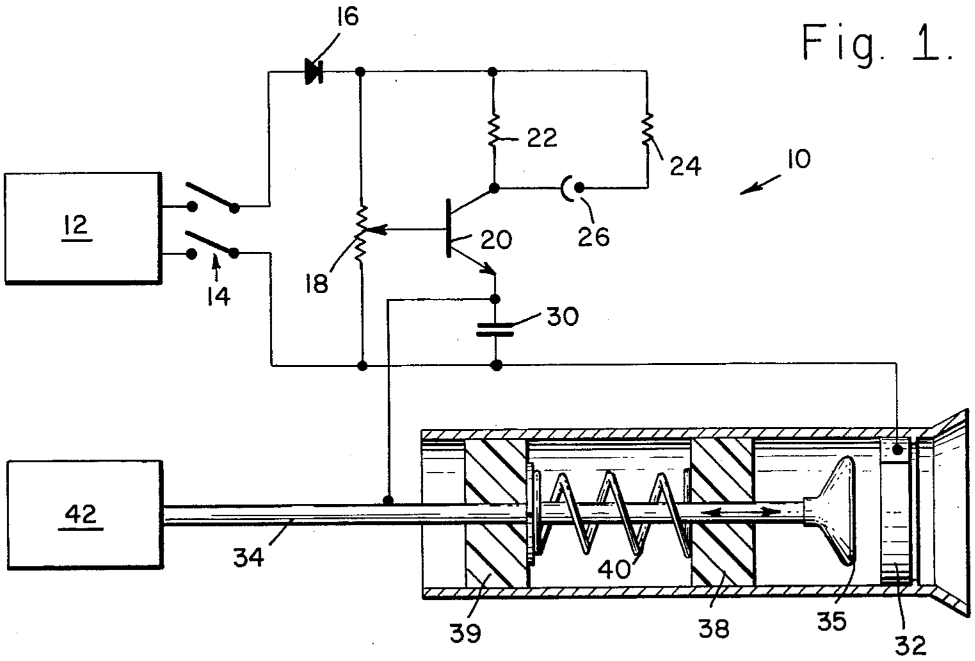
FIG. 1 is a schematic circuit diagram illustrating a first embodiment of an explosion simulation device according to the present invention.

Referring more specifically to FIG. 1 an explosion simulation network 10 includes a power source or supply 12 such as a 110 volt supply or a battery. The power supply 12 may be turned on and off by a double pole single throw switch 14. One pole of the switch 14 is connected to the anode electrode of a diode 16 for controlling the charge current whenever an a.c. power source is used. Thus charging occurs during only the positive half cycle. A variable bias resistor shown here as potentiometer 18 is connected between the cathode electrode of the diode 16 and the second pole of the switch 14. The potentiometer 18 controls the voltage to which the capacitor 30 is charged. The wiper terminal of the potentiometer 18 is connected to the base electrode of a transistor 20 shown here as a modified emitter follower configuration. A current limiting or load resistor 22 is connected between the cathode electrode of the diode 16 and the collector electrode of the transistor 20. One terminal of a resistor 24 is connected to the cathode electrode of the diode 16 while the other terminal is connected to the first electrode of a neon lamp 26. The neon lamp 26 provides a triple function in the circuit. Firstly, when the switch 14 is on, the lamp 26 glowes indicating that there is current flowing through resistor 22 causing a voltage drop thereacross. When the lamp turns off the capacitor is nearly fully charged to its preselected voltage. The lamp 26 may also glow to indicate there is fault in the circuit causing a high current to flow in resistor 22. A voltage divider may be used in lieu of the potentiometer 18. The emitter electrode of the transistor 20 is connected to the first terminal of a storage capacitor 30. The second terminal of the storage capacitor 30, having 2000–3000 microfarad capacity, is connected to the second pole of the switch 14 and to a first conductive contact 32 which is mounted at the muzzle end of a gun barrel 33 of a toy gun or canon. The first electrode of the capacitor 30 is also connected to a plunger rod 34 having a second conductive contact 35 mounted thereon. The capacitor 30 may be any commercially available capacitor such as made by Sprague Electronics.

The barrel 33 may be made of a conductive material such as brass, iron or steel and has a recessed ring at the muzzle end to which the second terminal of the storage capacitor 30 is connected. A coiled metal band forms a contact 32 and is inserted into the recessed ring at the end of the barrel 33. The dielectric annular rings 38 and 39 may be attached to the gun barrel 33 by any convenient method such as cement or having a "press-fit" with the barrel 33. The inside diameter of the rings 37 and 38 should be of sufficiently large size to allow the plunger rod 34 to slide freely back and forth. The plunger 34 has a washer affixed to it for resting against an end of a compression spring 40. The other end of the spring rests against the annular ring 38. The spring 40 automatically returns the rod 34 after the toy gun has been fired. Any other convenient method may be used to return the rod and separate the two contacts after firing.

A control unit 42 is connected to one end of the plunger 34 for moving the plunger back and forth. The control unit 42 may be any number of convenient means. For example, the rod 34 may be manually moved to make and break contact between the contacts 32 and 35. The control unit 42 may consist of a soleniod which is energized by a sound activated amplifier. A sound activated control unit 42 may be utilized with a burglar alarm system according to the present invention. Alternately, the control unit 42 may be a motor driven cam which activates the rod 34 for repetitive firing. If used in a toy gun the control unit 42 may be the trigger and hammer which strikes the rod 34 moving it forward so that the contact 32 and 35 make electrical connection for discharging the capacitor 30.

A forward motion of the plunger 34 causes the contacts 32 and 35 to touch and discharge the capacitor 30. As the capacitor 30 is discharged a loud bang or report is generated along with a flash of light and some smoke. The intensity or amplitude of the report is determined by the voltage across the capacitor 30 as determined by the potentiometer 18. The flash and noise are proportional to $V^2C$ where V is the voltage across the capacitor and C is the capacitance in microfarads. With repeated use the contacts 32 and 35 are gradually worn away but these may be easily replaced.

Figure 2:
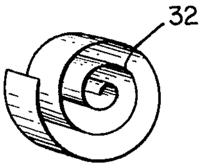
FIG. 2 is a perspective view illustrating a contact for discharging the storage means of FIG. 1.

Referring now to FIG. 2, a typical contact member 32 is described in greater detail. The contact 32 is an electrically conductive metal band that is formed into a coil. The metal band should have a thin cross section so that only a small area touches contact 35 for greater effect. The contact 32 may have any other convenient shape. For example, instead of a coiled band a straight band or pin may be used.

Figure 3:
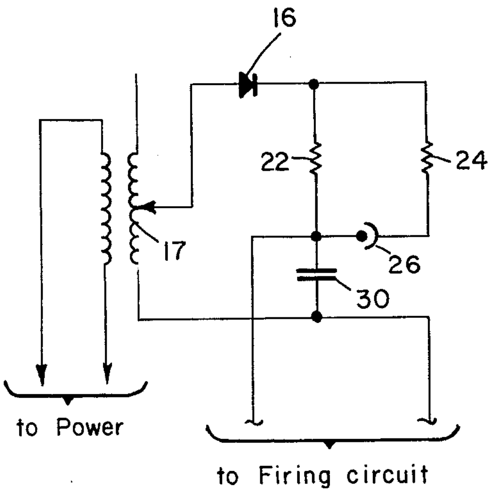
FIG. 3 is a schematic circuit diagram illustrating a second embodiment of the present invention.

Referring now to FIG. 3, another embodiment according to the present invention is described. The primary winding of an isolation transformer 17 receives power from the power supply 12. The secondary winding of the transformer 17 has several points available for connection to the anode electrode of the diode 16. The cathode electrode of the diode 16 is connected to the load resistor 22. The resistor 22 in connected to one electrode of the capacitor 30. The neon lamp 26 and resistor 24 are series connected together and connected in parallel with the resistor 22. The two electrodes of the capacitor 30 are connected to firing mechanism as illustrated to FIG. 1. The circuit according to FIG. 3 is substantially similar to the operation of FIG. 1 except that the circuit is isolated from the power source 12 by the transformer. Also the transformer 17 with multiple terminals directly controls the charging of the capacitor 30 instead of controlling a transistor which in turn controls the capacitor 30.

Figure 4:
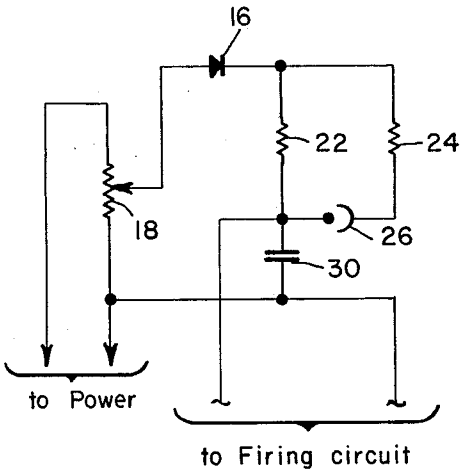
FIG. 4 is a schematic circuit diagram illustrating a third embodiment of the present invention.

Referring more specifically to FIG. 4, a third embodiment according to the present invention is now described. The circuit of FIG. 4 is similar to the circuit of FIG. 3 except that a potentiometer 18 is used instead of the isolation transformer 17 for directly controlling the charging of the capacitor 30. Since the operation of the third embodiment is substantially similar to the operation of both the first and second embodiments, the operation of the circuit of FIG. 4 will not be described.

Special applications and cost will determine the selection of control circuits of FIG. 1, FIG. 3, and FIG. 4.

Several toys utilizing the circuits described herein have been built. For example, a toy cannon was fitted with the circuit according to FIG. 1 and operated from a 110V a.c. supply and it was found to provide a very realistic report. A battery operated pistol has also been built and tested. A commercially available toy gun was used and a circuit according to the invention was fitted within the gun.

Although the present invention has been shown and described with reference to particular embodiments, nevertheless various changes, modifications, obvious to one skilled in the art to which the invention pertains are deemed to lie within the purview of the invention.

What is claimed is:

1. An explosion simulation device, comprising:
power input means;
charge regulation means coupled to said power input means for receiving power therefrom and providing energy to energy storage means;
energy storage means for storing energy from said power input means in response to said charge regulation means, said energy storage means having first and second electrodes;
barrel means;
first contact means being coupled to the first electrode of said energy storage means being disposed in said barrel means;
second contact means being coupled to the second electrode of said energy storage means for making electrical connection with said first contact means for rapidly discharging energy stored in said energy storage means and simulating an explosion, said second contact means being movably mounted within said barrel means; and
support means for movably mounting said second contact means within said barrel means.

2. The invention according to claim 1, comprising said charge regulation means including a potentiometer having first, second and third electrodes said first electrode being coupled to said power input means, said second electrode being coupled to the first;
said current means including a transistor having first, second and third electrodes, said first electrode being coupled to said power input means, said second electrode being coupled to the second electrode of said energy storage means, said third electrode being coupled to the third electrode of said potentiometer for controlling current flow into said energy storage means from said transistor.

3. The invention according to claim 1, comprising:
spring means coupled to said second contact means for disengaging said first and second contact means after electrical contact.

4. The invention according to claim 1 wherein said support means comprise:
plunger means being coupled to said second contact means for selectively moving said second contact means for making electrical contact with said first contact means; and
annular ring means for movably mounting said plunger means.

5. An explosion simulating device comprising:
power input means;
charge regulation means coupled to said power input means for receiving power therefrom and for providing energy to energy storage means;
energy storage means for storing energy from said power input means in response to said charge regulating means, said energy storage means having first and second electrodes;
first contact means being coupled to the first electrode of said energy storage means;
second contact means being coupled to the second electrode of said energy storage means for making electrical connection with said first contact means for rapidly discharging energy in said energy storage means and simulating an explosion;

support means for movably mounting said second contact means; and solenoid means being coupled to said second contact means for selectively moving said second contact means for making electrical connection with said first contact means.

6. The invention according to claim 5 wherein said solenoid means comprise:

sound actuating amplifier means for controlling said second contact means for simulating an explosion.

7. The invention according to claim 5, wherein said charge regulating means comprise:

a transistor having first, second and third electrodes;

said first electrode being coupled to the second electrode of said energy storage means for providing current thereto in response to the control signal on the second electrode of said transistor;

voltage control means coupled to the second electrode of said transistor and to said power input means, said voltage control means being for providing a control signal for controlling said transistor; and load resistor coupled between said input power means and the third electrode of said transistor for providing current to said energy storage means.

8. The invention according to claim 5 wherein said charge regulating means comprise:

transformer means having primary and secondary windings, said primary windings being coupled to said input power means; and a resistor coupled to the secondary winding of said transformer for providing current to said energy storage means.

9. The invention according to claim 5 wherein said charge regulating means comprise:

voltage divider means coupled to said power input means;

a resistor coupled to said voltage divider means for providing current to said energy storage means.

10. The invention according to claim 5 further comprising:

control means coupled to said second contact means for selectively providing electrical connection between said first and second contacts for discharging said energy storage means, said control means being responsive to a preselected signal.

* * * * *